2,704,760
Patented Mar. 22, 1955

2,704,760

ORGANIC COMPOUNDS AND THEIR SYNTHESIS

Reuben G. Jones, Indianapolis, Ind., assignor to Eli Lilly and Company, Indianapolis, Ind., a corporation of Indiana No Drawing. Application March 16, 1951,
Serial No. 216,087

4 Claims. (Cl. 260—295)

This invention relates to novel organic compounds and their preparation, and more particularly to novel compounds useful as intermediates in the synthesis of pyridoxine, and to their preparation.

The compounds and processes of this invention are represented by the following equations. In the formulas, R represents an esterifying radical, $R_1$ represents a lower alkyl radical and Ac represents an acyl radical of a lower aliphatic carboxylic acid.

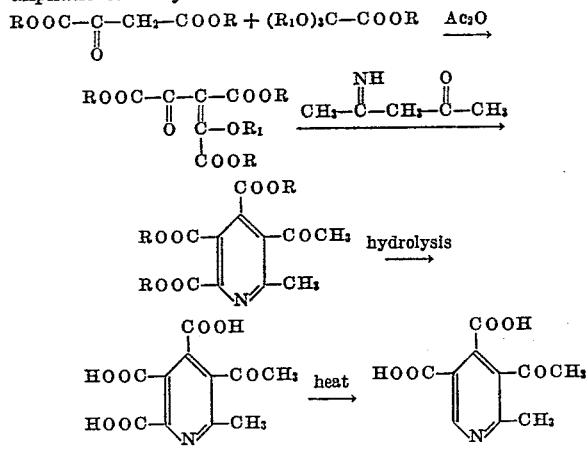

From the above equations it will be seen that the overall process of this invention comprises the following steps. An ester of oxalacetic acid is reacted with an ester of α-trialkoxyacetic acid in the presence of a lower aliphatic acid anhydride to yield an ester of an α-keto-γ-alkoxyaconitic acid. This last compound is cyclized with iminoacetylacetone to produce an ester of 2-methyl-3-acetyl-4,5,6-pyridinetricarboxylate. The pyridine triester is hydrolyzed with acid or alkali to yield the corresponding pyridinetricarboxylic acid which, upon heating loses carbon dioxide, forming 2-methyl-3-acetyl-4,5-pyridinedicarboxylic acid.

2-methyl-3-acetyl-4,5-pyridinedicarboxylic acid is converted to 2-methyl-3-amino-4,5-pyridinedicarboxylic acid by treatment with hydrazoic acid by the method disclosed and claimed in my copending application Serial No. 216,085, filed on even date herewith, now abandoned. The amino compound is converted into 2-methyl-3-hydroxy-4,5-pyridinedicarboxylic acid by treatment with nitrous acid, and the hydroxy acid in the form of its ester is converted to pyridoxine by reduction with lithium aluminum hydride in accordance with British Patent No. 629,450.

Esters of α-keto-γ-alkoxyaconitic acid and their preparation are disclosed and claimed in my copending application Serial No. 426,563 filed April 29, 1954.

In the specific examples to follow, the invention is illustrated with particular reference to compounds in which R, $R_1$, and Ac represents respectively, ethyl, ethyl, and acetyl. It is to be understood, however, that the invention is not limited to these specific radicals but embraces equivalents thereof. Thus this invention includes within its scope esterifying radicals other than the ethyl radical. It will be obvious to those skilled in the art that numerous esterifying radicals may be used, and that the radicals chosen for use should not contain functional groups which would seriously interfere with or prevent the desired reaction from taking place. Of the many available esterifying radicals, the preferred radicals are the lower alkyl radicals, i. e., radicals having from 1 to 6 carbon atoms. This range of alkyl radicals is likewise preferred for the radical set forth in the formula as $R_1$. Thus, for example, within the scope of this invention are the methyl, butyl, hexyl, and benzyl esters of α-keto-γ-methoxy-, propoxy-, and amoxy-aconitic acid, and the corresponding esters of 2-methyl-3-acetyl-4,5,6-pyridinetricarboxylic acid.

The following specific examples further illustrate this invention.

EXAMPLE 1

*Triethyl-2-methyl-3-acetyl-4,5,6-pyridinetricarboxylate*

Ethyl-α-keto-γ-ethoxyaconitate is prepared as follows: 220 g. (1 mol) of ethyl triethoxyacetate [prepared by the method of Anschutz; Ann. 254, 3 (1899)], 188 g. (1 mol) of diethyl oxalacetate [prepared by the method of Beilstein, vol. 3, page 782], and 225 g. (2.2 mol) of pure acetic anhydride were mixed in a flask provided with an air reflux condenser, and the mixture was heated in an oil bath for one hour at about 120° C. and for about eight hours at about 140° C. The ethyl acetate formed during the reaction was allowed to escape through the condenser. The reaction product was distilled under reduced pressure. A forerun consisting of acetic acid, acetic anhydride, ethyl oxalate and unchanged ethyl oxalacetate was obtained followed by the distillation of ethyl α-keto-γ-ethoxyaconitate which distilled at a temperature of 154–156° C. at a pressure of about 0.3 mm. of mercury.

To 64 g. (0.2 mol) of ethyl α-keto-γ-ethoxyaconitate were added 25 g. (0.25 mol) of iminoacetylacetone. The mixture was occasionally stirred until the iminoacetylacetone had dissolved which required about one half hour. After standing for about one hour the temperature of the solution had risen spontaneously to about 50° C. The solution was heated at about 60–70° C. for about 2 hours and then cooled and extracted with 250 ml. of ether. The ether extract was separated, and washed with two 300 ml. portions of saturated sodium carbonate solution, and was dried, and the ether evaporated. The residual liquid consisting of triethyl 2-methyl-3-acetyl-4,5,6-pyridinetricarboxylate was purified by distillation in high vacuum. 48 g. (69 percent of theory) of substantially pure ester were obtained. It boiled at about 190–195° C. at about 1 mm. pressure of mercury. The refractive index and density were as follows: $n_D^{25} = 1.4973$;

$$d_{25}^{25} = 1.178$$

Analysis showed the presence of 57.67 percent carbon, 6.24 percent hydrogen and 3.85 percent nitrogen as compared with the calculated values of 58.11 percent carbon, 6.03 percent hydrogen and 3.99 percent nitrogen.

EXAMPLE 2

*2-methyl-3-acetyl-4,5-pyridinedicarboxylic acid*

A solution of 17.5 g. (0.05 mol) of triethyl-2-methyl-3-acetyl-4,5,6-pyridinetricarboxylate in 20 ml. of 12 N hydrochloric acid was heated at about 90° C. for about three hours. 20 ml. of water was added to the hot solution and heating was continued for three hours. The solution was evaporated in vacuo leaving a residue of 2-methyl-3-acetyl-4,5,6-pyridinetricarboxylic acid. The pyridinetricarboxylic acid which was in the form of a syrup was not purified but was used in crude state as follows: The syrup was dissolved in 40 ml. of hot diethylene glycol diethyl ether and the solution was heated slowly to about 150° C. and the temperature was maintained for about one hour. Carbon dioxide gas was evolved rapidly at first, but during the last half hour of heating, evolution of gas was slow. The reaction mixture was evaporated in vacuo leaving a syrupy residue, and to the residue were added 50 ml. of water. 12 g. of sodium carbonate monohydrate were added to the mixture in small portions with stirring and warming. The solution obtained was heated to boiling point, 2 g. of decolorizing carbon were added and the mixture filtered. The filtrate was cooled, was acidified with hydrochloric acid, and the acidified mixture was allowed to stand in a refrigerator. After several hours 6.2 g. (56 percent of theory) of 2-methyl-3-acetyl- 4,5-pyridinedicarboxylic acid precipitated. The precipitate was filtered off, washed with a small amount of water and dried. It melted with decomposition at about 230–232° C.

I claim:

1. In the method of preparing a tri-lower alkyl ester of 2-methyl-3-acetyl-4,5,6-pyridinetricarboxylic acid, the process step which comprises heating a lower alkyl ester of α-keto-γ-alkoxyaconitic acid with iminoacetylacetone.

2. A tri-lower alkyl ester of 2-methyl-3-acetyl-4,5,6-pyridinetricarboxylic acid.

3. The tri-ethyl ester of 2-methyl-3-acetyl-4,5,6-pyridinetricarboxylic acid.

4. 2-methyl-3-acetyl-4,5,6-pyridinetricarboxylic acid.

No references cited.